March 12, 1957 A. KAPLAN 2,784,615
HAND THROTTLE DEVICE FOR MOTOR VEHICLES
Filed Nov. 16, 1953

Inventor:
Aaron Kaplan
by his Attorneys
Howson & Howson

United States Patent Office 2,784,615
Patented Mar. 12, 1957

2,784,615

HAND THROTTLE DEVICE FOR MOTOR VEHICLES

Aaron Kaplan, Ardmore, Pa.

Application November 16, 1953, Serial No. 392,165

2 Claims. (Cl. 74—482)

This invention relates to improvements in manual devices for controlling the operations of the carburetor of motor vehicles.

A principal object of the invention is to provide a simple and inexpensive device whereby the operator of a motor vehicle may control the operation of the carburetor selectively by foot or hand, the hand operating device being such as to involve no essential interference with or modification of the steering function.

More specifically, an object of the invention is to provide a manual carburetor control device comprising a handle element adapted for operation by extension or contraction of the fingers of one hand while the palm and thumb of the hand occupy a normal wheel-gripping position, together with means for operatively connecting the handle element to the carburetor so that it may be free to move in a circular arc with the wheel without material effect upon the fuel-feeding rate of the carburetor.

A still further object is to provide a manual control device of the stated type wherein the handle element of the device is supported flexibly in a position adjoining the underside of the steering wheel and readily accessible to the hand of an operator manipulating the wheel;

Still another object of the invention is to provide a device of the stated type which may be readily attached to the motor vehicle by conventional tools and without services of a trained mechanic.

Figure 1:
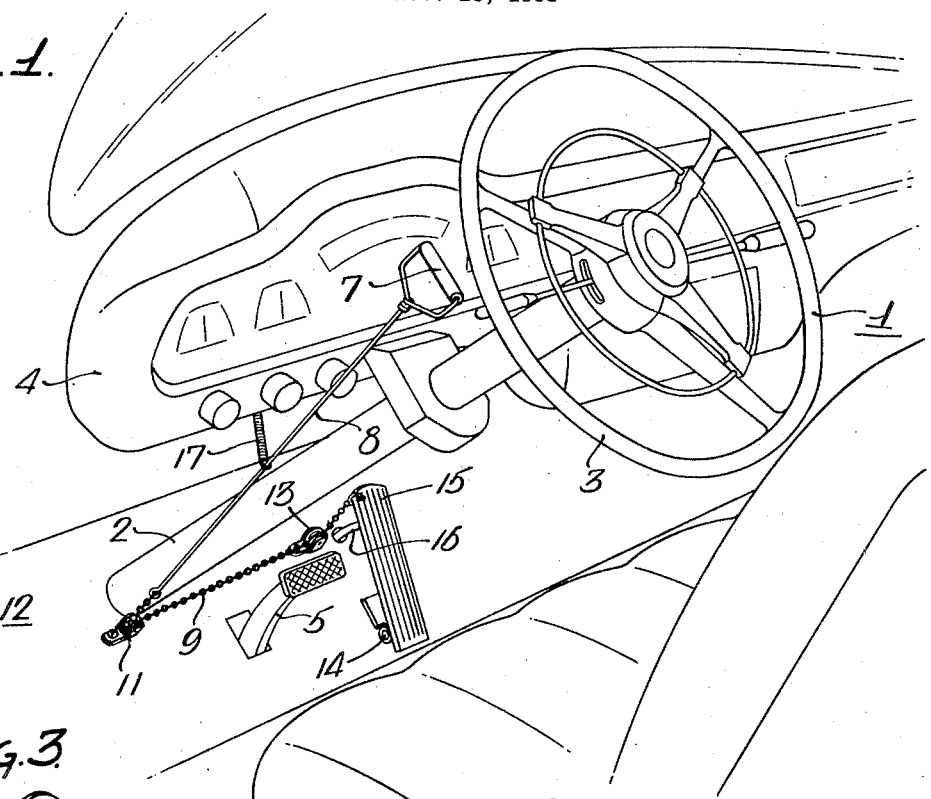
Fig. 1 is a fragmentary view in perspective illustrating a preferred embodiment of my invention.
Figure 3:
Fig. 3 is a view in perspective of one of the elements of the device.

With reference to the drawings, 1 is the steering wheel of a conventional automotive vehicle and 2 is the steering post. In accordance with the usual practice, the steering wheel 1 comprises a rim 3 which is adapted to be gripped by the hands of an operator in performance of the steering function. Reference numeral 4 indicates the dashboard of the vehicle, 5 is the brake pedal, and 6 is the accelerator pedal which is normally operated by a foot of the operator.

In accordance with the present invention, I provide a handle element 7 which is located, by means hereinafter described, in a position below and in proximity to the rim 3 of the steering wheel 1. Extending downwardly from the handle element 7 is a rod 8, preferably flexible, and attached at its lower end to one end of a chain 9. This chain passes through a pulley 11 or other guide element at the floor 12 of the vehicle and transversely to a second pulley or guide 13 secured to the floor in close proximity to the upper or free end of the pedal 6. The lower end of the pedal is hinged at 14 to the floor of the vehicle in accordance with conventional practice and the said upper or free end 15 of the lever is connected through an arm 16, and other elements not illustrated, with the carburetor of the motor vehicle.

In accordance with the invention, the pulley 11 is located close to the lower end of the steering column 2 so as to be as nearly as possible in alignment with the axis of the steering wheel 1. In this position, the pulley 11 forms a pivot about which the rod 8 and the immediately adjoining portion of the chain 9 may pivot angularly in response to a movement of the handle element 7 in a circular arc corresponding in radius to the radius of the rim 3 of the steering wheel and below and parallel to the latter. In other words, the location of the pulley 11 is such that without material longitudinal movement of the rod 8 and chain 9, the handle element 7 may move in the aforesaid arcuate path through an angle corresponding substantially to the angular movements of the steering wheel in the normal operation of the vehicle. Normally, the handle element 7 is supported by a spring 17 in an inoperative position below the wheel 1 and readily accessible to the hand of the operator manipulating the wheel.

Figure 2:
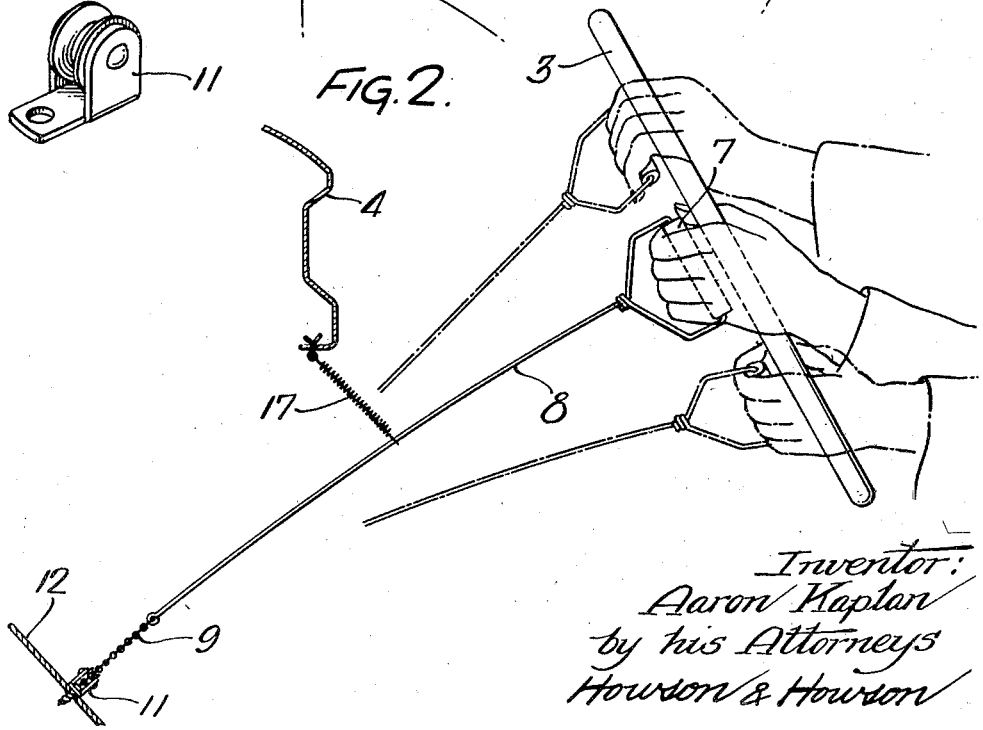
Fig. 2 is a side view of the device illustrated in Fig. 1 and illustrates the manner in which the manual control is operated.

In operation, and as shown in Fig. 2, the handle element 7 will be held in the fingers of one hand of the operator, the left hand in the present embodiment, with the palm and thumb of the hand in normal gripping relation to the rim 3. When thus held, contraction of the fingers will result in an elevation of the handle element toward the underside of the rim and a consequent longitudinal adjustment of the rod 8 and chain 9, and a depression of the pedal 6 which under normal conditions is supported in a relatively elevated position on the hinge 14 by suitable spring means not shown. The said elevation of handle element 7 is in opposition to the pedal spring, and a subsequent extension of the fingers will, therefore, result in a downward or return movement of the handle toward its original position. Obviously, the elevation of the handle element 7 and consequent depression of the pedal 6 will result in an increase in the fuel feed rate of the carburetor, and a subsequent extension of the fingers, permitting the pedal 6 to move toward its normal elevated position, will result in a progressive decrease in the rate of feed. In each of these operations, the hand of the operator still occupies a substantially normal position with respect to the rim 3 of the steering wheel so that there is no material interference with the full control of the wheel. On the other hand, if desired, the operator may be simple release of the handle 7 cause the carburetor to be adjusted automatically to the idling position, and subsequent control of the carburetor may then be assumed by way of the operator's foot on the pedal 6. On release of the handle 7, the spring 17 acts to retract the handle to a position clear of the wheel and of the hands of the operator, as illustrated in broken lines in Fig. 1, and the accelerator 15 may then be actuated by the foot without interference.

As previously set forth, the pulley 11 operating as a fixed pivot for the upwardly extending portion of the connector between the pedal 6 and the handle 7 will permit a movement of the handle element 7 in the fingers of the operator, as illustrated in Fig. 2, in a circular path corresponding to the arc of the rim 3 and through a substantial angle without resultant material longitudinal movement of the rod 8 and chain 9. Such slight longitudinal movement as may normally result from such arcuate movement of the handle 7 may be readily compensated by a slight extension or contraction of the fingers of the operator, so that in any normal angular movement of the steering wheel, adjustment of the pedal 6 and of the carburetor will remain unchanged. Obviously, if the pulley 11 or the pivot point represented by this pulley were in the lien of the rotary axis of the wheel 1, the theoretical arcuate movement of the handle 7 without longitudinal movement of the rod 8 and chain 9 would be unlimited. Such slight deviation from this ideal condition which is involved in the location of the pulley 11 to one side of the axial line may be readily compensated by a slight flexing of the fingers of the operator holding the handle 7.

It is apparent that the device is extremely simple in form and inexpensive in manufacture, and that the installation of the device in the motor vehicle, involving only the attachment of the chain 9 to the pedal 6, attachment of the spring 17 to the underside of the dashboard, and attachment of the pulleys 11 and 13 to the floor of the vehicle, may be accomplished with ordinary tools and without recourse to a trained mechanic. It is obvious also that there may be considerable modification in the details of the device, particularly in the means for connecting the handle 7 to the carburetor, without departure from the essential principle of the invention as defined in the appended claims.

I claim:

1. A manual carburetor control device for motor vehicles, said device comprising the combination with the steering wheel of said vehicle and its rim of a handle element adapted to be held simultaneously with said rim in one hand of an operator with the thumb and palm of the hand in substantially normal rim-gripping position and with the handle element supported in the fingers of the hand at the underside of the rim, whereby the said element may be moved upwardly and downwardly with respect to the rim by contraction and extension of the fingers respectively, and means including a handle-supporting rod extending downwardly from the handle element toward and at an acute angle to the line coinciding with the axis of the wheel for operatively connecting the handle element to the carburetor so that the said upward movements of said element may effect a progressively increasing fuel feed rate and the said downward movements may effect a progressive decrease in said rate of feed, and resilient means remote from the underside of the wheel for supporting the rod with the handle element in an inoperative position readily accessible to the fingers at the underside of the rim.

2. A carburetor control according to claim 1 wherein the operative connection between the handle element and the carburetor comprises flexible means attached to the lower end of the rod, a guide element for said flexible means remote to said wheel and in proximity to said axial line, said guide element forming a pivot for the flexible means about which the latter together with the said rod may move angularly without material longitudinal movement in response to a movement of the handle element in a circular arc corresponding approximately in radius to the circumference of the said rim and approximately parallel to the latter.

References Cited in the file of this patent
UNITED STATES PATENTS

| | | |
|---|---|---|
| 1,353,379 | Caulfield | Sept. 21, 1920 |
| 1,683,111 | Washington | Sept. 4, 1928 |
| 2,185,170 | Armstrong | Jan. 2, 1940 |
| 2,200,625 | Koppel | May 14, 1940 |
| 2,501,249 | Wilsdorf | Mar. 21, 1950 |

FOREIGN PATENTS

| | | |
|---|---|---|
| 356,325 | Great Britain | Sept. 10, 1931 |